J. JACOBS.
Bee Hive.
No. 26,591.
Patented Dec. 27, 1859.
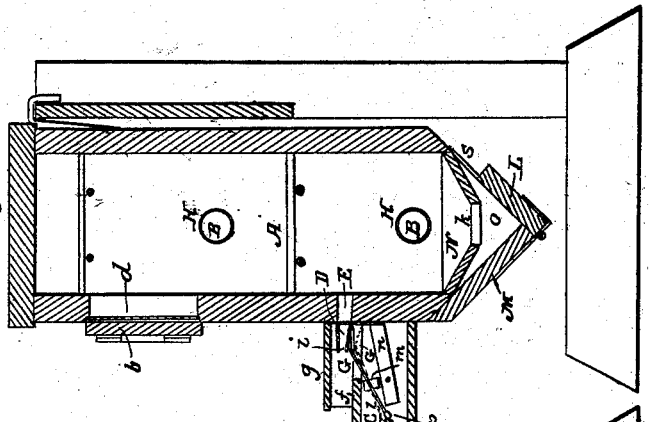
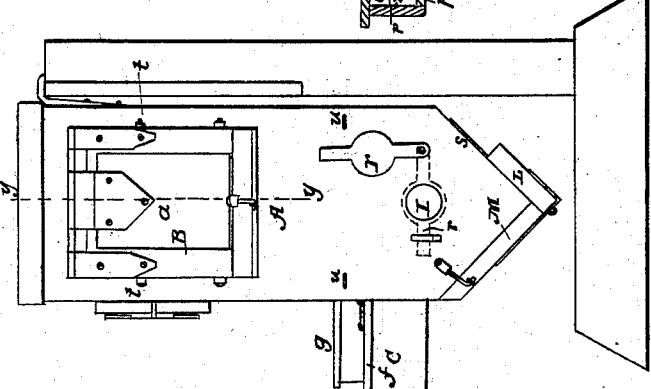
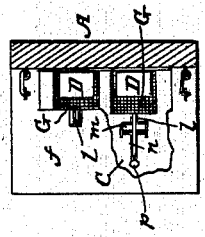
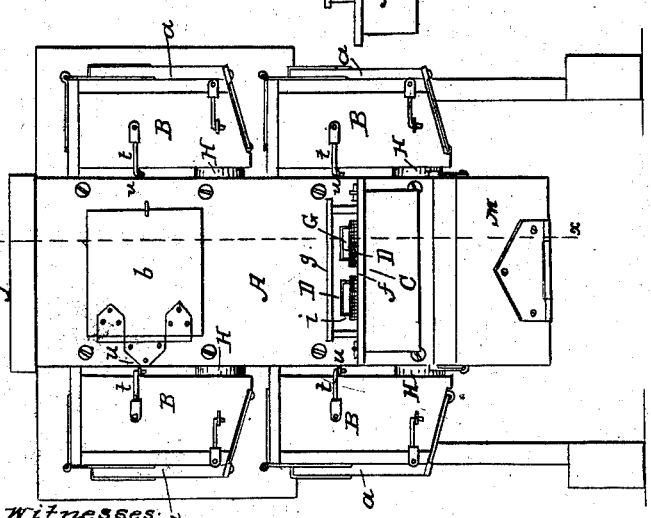
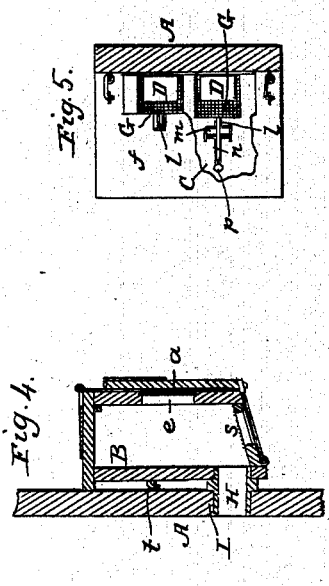

UNITED STATES PATENT OFFICE.

JESSE JACOBS, OF YELLOW SPRINGS, OHIO.

BEEHIVE.

Specification of Letters Patent No. 26,591, dated December 27, 1859.

*To all whom it may concern:*

Be it known that I, JESSE JACOBS, of Yellow Springs, in the county of Greene, in the State of Ohio, have invented a new and useful Beehive; and I do hereby declare that the following is a full and exact description thereof, reference being had to the accompanying drawings and to the letters of reference marked thereon, Figure 1, being a front elevation of the hive complete; Fig. 2, a side elevation thereof, with only one honey-box attached to the side in view; Fig. 3, a vertical section, in the plane indicated by the line $x\ x$, Fig. 1; Fig 4, a vertical section through one of the honey-boxes and a portion of the hive, showing how the box is attached; Fig. 5, a plan and partial section of a part detached.

Like letters designate corresponding parts in all the figures.

The main hive, or brood-box, A, may be made of any ordinary shape, and be suitably suspended, as shown in the drawings, or otherwise. It has a hopper-shaped bottom N, with a central aperture $k$, therein, as shown in Fig. 3; and below this, there is another bottom formed by two inclined sides L, M, meeting at the center, as represented in the same figure, so as to leave an open space $o$, between the two bottoms. One side M, is hinged, so as to open, for hiving the bees, and removing filth from the hive. The filth first drops on the hopper-like bottom N, and falls through the aperture $k$, therein, leaving the interior of the hive clean. The accumulation of the filth in the space $o$, is, from time to time, removed, by opening the door, or side, M. Thus are combined two advantages, keeping the interior of the hive clean, and, at the same time, excluding all insects or other intruders from entering the hive by the filth outlet.

The entrance, or entrances, E, (Fig. 3,) for the bees, I guard by an arrangement termed, a "valve," so that the bees can readily pass in and out, and yet moths, ants, and other vermin are completely excluded. The construction of this valve is substantially as follows: Each entrance E, through the wall of the hive, is surrounded, on the outside, by a small case D, which forms a kind of vestibule thereto, of suitable size to admit, at once, as many bees as desired. The material may be sheet-metal, and attached by a metallic plate, or otherwise, to the sides of the hive. The top may be horizontal, and the two opposite sides parallel; but the bottom slopes upward and outward, as shown in Fig. 3; and has an aperture $h$, through it, of sufficient size to admit the bees freely. The front $i$, is of glass, or other transparent substance, to admit light. The aperture $h$, is closed by a valve-pedal G, attached to the end of a vibratory rod $l$, which is pivoted in a bearing $m$, made adjustable on a suitable bar $n$, projecting from the front of the hive. A weight $p$, is attached to the other end of the said rod, to counterbalance the valve-pedal, and is made adjustable on the rod, so as to allow the pedal to descend by more or less weight, as desired. The valve-pedal is to be so counter-weighted that when a bee steps upon it, it will descend, so that the aperture $n$, will be open, free to allow the bee to enter the vestibule D, (as shown by red lines in Fig. 3,) and thence into the hive; but so that ants, bee-moths, or insects, or vermin of any kind, which ordinarily infest beehives, shall not depress it, and consequently will be excluded from the vestibule and hive. When the bees are to come out of the hive, they step upon the valve-pedal within the vestibule, and the pedal descending, in like manner, the way is free for their exit.

The object of the glass $i$, is to attract the bees out into the vestibule, by the light. The valve-pedal may be made of fine wire-gauze, as shown, so as to allow the air freely to circulate through the vestibule, and thus further attract the bees. After once or twice passing in and out, the bees learn the way, entering and going out, with as much readiness and facility as through an ordinary aperture. The valve-pedal is so shaped as to allow the bees to step on and off readily. A case C, surrounds the valve, or valves, as shown, the top $f$, thereof, serving as a platform for the bees to alight upon, before stepping on the valve-pedals. A cover $g$, over the valves, protects them from the weather.

The honey-boxes B, B, are connected with the brood-box A, at the sides. They may be of ordinary construction, except in the means by which a communication is formed between them and the brood-box. Each honey-box is provided with a short tube H, on one side, generally of wood, and projecting, say, far enough to reach about through the side of the brood-box A. A hole I, is made in the side of the brood-box, just large enough to receive each tube H. When the honey-box is not on the hive, a plate r, is made to close the hole I, as seen in red lines, in Fig. 2; but when the honey-box is to be attached, the plate is turned away, as shown in black lines, in the same figure. The honey-box is attached by inserting the tube H, in the hole I, and hooking a hasp, or two, t, on the honey-box, into a staple, or staples, u, on the side of the brood-box. Thus the tube H, not only serves as a passage for the bees into the honey-box, but also for attaching and supporting the honey-box. It also prevents the bees from gluing the honey-box to the brood-box by propolis; so that the honey-box is more readily taken off, than by other arrangements.

The honey-boxes have glass lights e, (Fig. 4,) in their front sides, to be covered by lids a, as represented, in order to observe the progress of the work inside. The brood-box may have a similar light d, (Fig. 3,) to be closed by a lid b. Ventilators s, s, of wire-gauze, are also respectively inserted in the bottoms of the brood-box and honey-boxes.

What I claim as my invention and desire to secure by Letters Patent is—

The "valve", composed essentially of the vestibule D, and adjustable counterweighted valve pedal G, arranged and operating substantially in the manner and for the purpose herein specified.

JESSE JACOBS.

Witnesses:
R. F. HOWARD,
G. W. HARPER.